United States Patent
Kobayashi

(10) Patent No.: US 11,946,658 B2
(45) Date of Patent: Apr. 2, 2024

(54) VENTILATION AIR CONDITIONING SYSTEM AND OUTDOOR AIR SUPPLY FAN

(71) Applicant: Panasonic Intellectual Property Management Co., Ltd., Osaka (JP)

(72) Inventor: Kazuyuki Kobayashi, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 569 days.

(21) Appl. No.: 17/268,881

(22) PCT Filed: Aug. 7, 2019

(86) PCT No.: PCT/JP2019/031160
§ 371 (c)(1),
(2) Date: Feb. 16, 2021

(87) PCT Pub. No.: WO2020/066319
PCT Pub. Date: Apr. 2, 2020

(65) Prior Publication Data
US 2021/0310674 A1    Oct. 7, 2021

(30) Foreign Application Priority Data
Sep. 27, 2018 (JP) ................. 2018-181124

(51) Int. Cl.
*F24F 11/00* (2018.01)
*F24F 7/013* (2006.01)
(Continued)

(52) U.S. Cl.
CPC .......... *F24F 11/0001* (2013.01); *F24F 7/013* (2013.01); *F24F 11/64* (2018.01);
(Continued)

(58) Field of Classification Search
CPC ............... F24F 11/0001; F24F 11/77; F24F 2011/0002; F24F 2110/32; F24F 2140/00; F24F 11/32
See application file for complete search history.

(56) References Cited

U.S. PATENT DOCUMENTS
2015/0050876 A1    2/2015  Sakai et al.

FOREIGN PATENT DOCUMENTS
JP    H08261540 A  * 10/1996
JP    2013-019572 A    1/2013
(Continued)

OTHER PUBLICATIONS

International Search Report issued in Patent Application No. PCT/JP2019/031160 dated Sep. 24, 2019.

*Primary Examiner* — Edelmira Bosques
*Assistant Examiner* — Michael James Giordano
(74) *Attorney, Agent, or Firm* — PEARNE & GORDON LLP

(57) ABSTRACT

A ventilation and air conditioning system includes: an outdoor air supply fan; an exhaust fan; and a system controller to control operations of the outdoor air supply fan and the exhaust fan. The system controller includes: a link controller; an exhaust air volume receiver; a disconnection determinator; and a disconnected state supply air controller. The link controller controls the outdoor air supply fan and the exhaust fan in a linked manner. The exhaust air volume receiver receives, from the exhaust fan, an exhaust air volume signal indicating an exhaust air volume of the exhaust fan. The disconnection determinator determines a disconnected state where the exhaust air volume receiver fails to receive the exhaust air volume signal. The disconnected state supply air controller controls the outdoor air (Continued)

supply fan at a predetermined air volume when the disconnected determinator determines the disconnected state.

10 Claims, 8 Drawing Sheets

(51) Int. Cl.
*F24F 11/64* (2018.01)
*F24F 11/77* (2018.01)
*F24F 110/32* (2018.01)
*F24F 140/00* (2018.01)

(52) U.S. Cl.
CPC ....... *F24F 11/77* (2018.01); *F24F 2011/0002* (2013.01); *F24F 2110/32* (2018.01); *F24F 2140/00* (2018.01)

(56) References Cited

FOREIGN PATENT DOCUMENTS

| | | | |
|---|---|---|---|
| JP | 2014-005986 A | 1/2014 |
| JP | 2014-077623 A | 5/2014 |
| JP | 2016-211794 A | 12/2016 |
| JP | 2018-109460 A | 7/2018 |

* cited by examiner

VENTILATION AIR CONDITIONING SYSTEM AND OUTDOOR AIR SUPPLY FAN

TECHNICAL FIELD

The present disclosure relates to a ventilation and air conditioning system and an outdoor air supply fan.

BACKGROUND ART

A ventilation and air conditioning system with a first type of ventilation system is known which is constructed for a building, such as a house. The ventilation and air conditioning system with the first type of ventilation system includes an exhaust fan capable of conveying air from the inside to the outside of the building and an outdoor air supply fan capable of conveying air from the outside to the inside of the building. In one kind of such a ventilation and air conditioning system, ventilation is performed by individually controlling the volume of air (air volume) of an exhaust fan and the air volume of an outdoor air supply fan while the fans are operated in a linked manner (for example, Patent Literature (PTL) 1).

For example, a ventilation and air conditioning system is available which operates an outdoor air supply fan at the supply air volume according to the exhaust air volume of an exhaust fan. In such a ventilation and air conditioning system, the air volume is set at the time of installation so that the exhaust fan and the outdoor air supply fan which are operated individually while being linked to each other in the building have the same performance. On the other hand, when the air volume of the exhaust fan becomes different from the initial setting due to an automatic operation by a sensor or a user operation, the ventilation and air conditioning system changes the supply air volume of the outdoor air supply fan to correspond to the exhaust air volume. In order to achieve such a ventilation and air conditioning system, the exhaust fan and the outdoor air supply fan installed in the building are linked to each other in a wired or wireless connection.

CITATION LIST

Patent Literature

[PTL 1] Japanese Unexamined Patent Application Publication No. 2014-5986

SUMMARY OF THE INVENTION

In such a ventilation and air conditioning system, when the wired or wireless linked connection is blocked or cut off, the outdoor air supply fan cannot know the operating state of the exhaust fan. In such a case, the outdoor air supply fan cannot be operated at the supply air volume according to the exhaust air volume of the exhaust fan. Hence, the outdoor air supply fan is stopped in the conventional ventilation and air conditioning system. However, in such a case, the outdoor air supply fan is stopped while the exhaust fan is operating. This disrupts supply and exhaust air balance, which hinders achievement of the original purpose of the first type of ventilation system where designed ventilation is to be stably performed. In addition, there is a concern that the inside of the building becomes negatively pressurized, causing the outdoor air to flow to the inside through the gap, making the window sash become difficult to open or the like.

The present disclosure has been conceived in order to solve the above described problems. An object of the present disclosure is to provide a ventilation and air conditioning system and an outdoor air supply fan which are capable of stably performing ventilation even when the linked connection between the exhaust fan and the outdoor air supply fan is cut off.

In order to achieve the above object, a ventilation and air conditioning system according to the present disclosure includes an outdoor air supply fan, an exhaust fan, and a system controller. The outdoor air supply fan supplies outdoor air into a room. The exhaust fan exhausts outdoor air from the inside of the room. The system controller is communicatively connected to the outdoor air supply fan and the exhaust fan to control the operations of the outdoor air supply fan and the exhaust fan. The system controller includes a link controller, an exhaust air volume receiver, a disconnection determination unit, and a disconnected state supply air controller. The link controller controls the outdoor air supply fan and the exhaust fan in a linked manner. The exhaust air volume receiver receives, from the exhaust fan, an exhaust air volume signal indicating the exhaust air volume of the exhaust fan. The disconnection determination unit determines a disconnected state where the exhaust air volume receiver fails to receive the exhaust air volume signal. The disconnected state supply air controller controls the outdoor air supply fan at a predetermined air volume when the disconnection determination unit determines the disconnected state.

The outdoor air supply fan according to the present disclosure includes a fan and a system controller. The fan supplies outdoor air into a room. The system controller is communicatively connected to the exhaust fan which exhausts the outdoor air from the room, and controls the operations of the fan and the exhaust fan. The system controller includes a link controller, an exhaust air volume receiver, a disconnection determination unit, and a disconnected state supply air controller. The link controller controls the fan and the exhaust fan in a linked manner. The exhaust air volume receiver receives, from the exhaust fan, an exhaust air volume signal indicating the exhaust air volume of the exhaust fan. The disconnection determination unit determines a disconnected state where the exhaust air volume receiver fails to receive the exhaust air volume signal. The disconnected state supply air controller controls the fan at a predetermined air volume when the disconnection determination unit determines the disconnected state.

According to the ventilation and air conditioning system and the outdoor air supply fan in the present disclosure, when the disconnection determination unit determines the disconnected state where the exhaust air volume receiver fails to receive the exhaust air volume signal, the outdoor air supply fan is controlled by the disconnected state supply air controller at a predetermined air volume. Accordingly, even when the lined connected between the exhaust fan and the outdoor air supply fan is cut off, ventilation can be stably performed.

DESCRIPTION OF EMBODIMENTS

Figure 1:
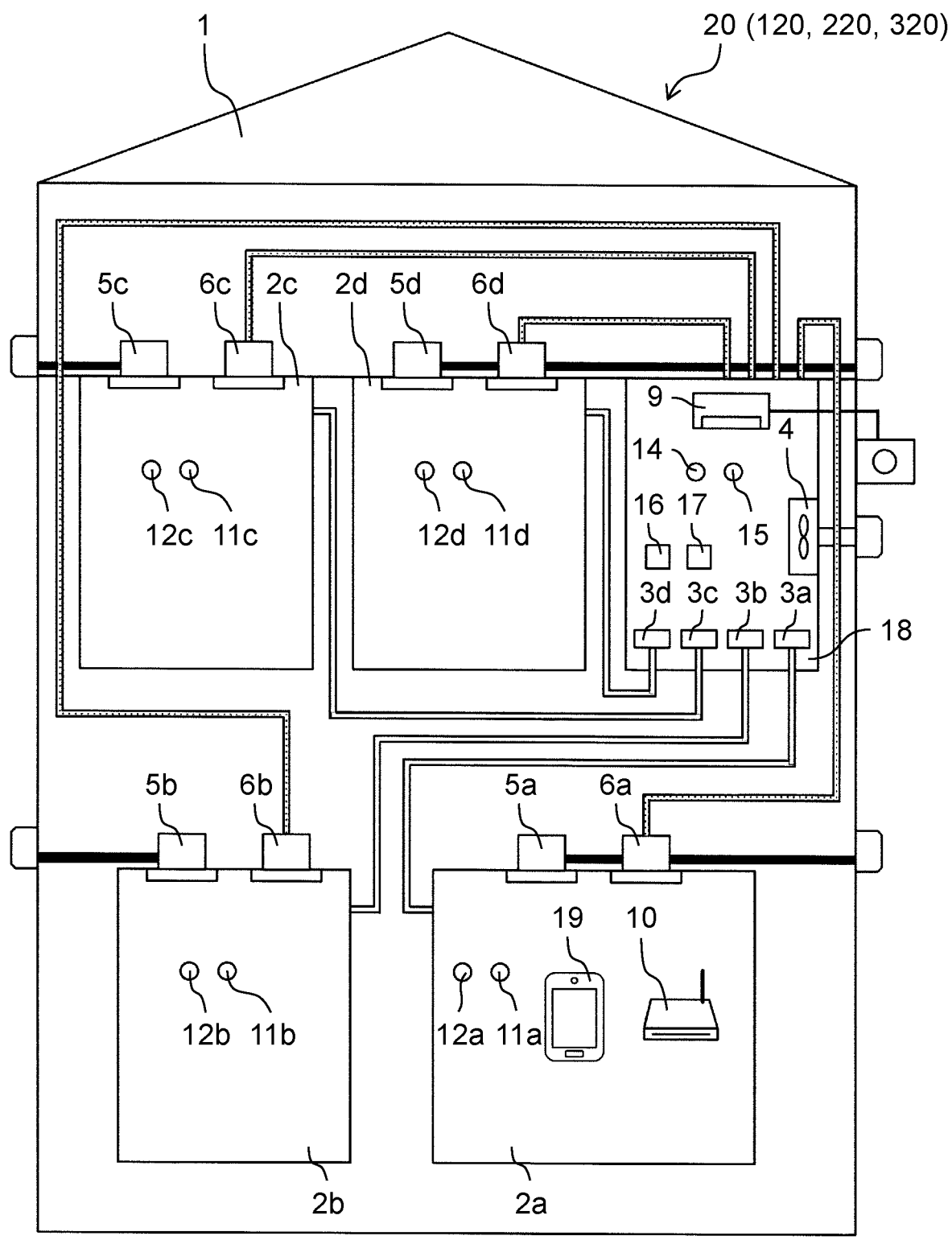
FIG. 1 is a schematic connection diagram of a ventilation and air conditioning system according to Embodiment 1 of the present disclosure.

Hereinafter, embodiments for implementing the present disclosure will be described with reference to the accompanying drawings. Each of the embodiments described below shows a preferred specific example of the present disclosure. Therefore, the numerical values, shapes, materials, structural elements, arrangement positions and connection forms of the structural elements, steps (processes), order of steps, and the like shown in the following embodiments are merely examples, and are not intended to limit the present disclosure. Therefore, among the structural elements in the following embodiments, structural elements which are not recited in independent claims indicating the highest concept of the present disclosure are described as arbitrary structural elements. In addition, in each of the drawings, substantially the same configuration is denoted by the same reference numeral, and redundant description will be omitted or simplified.

Embodiment 1

First, ventilation and air conditioning system 20 according to Embodiment 1 of the present disclosure will be described with reference to FIG. 1. FIG. 1 is a schematic connection diagram of ventilation and air conditioning system 20 according to Embodiment 1 of the present disclosure.

Ventilation and air conditioning system 20 includes: outdoor air supply fan 4; a plurality of exhaust fans 5a, 5b, 5c, 5d; a plurality of conveying fans 3a, 3b, 3c, 3d; a plurality of circulation fans 6a, 6b, 6c, 6d; room temperature sensors 11a, 11b, 11c, 11d; room humidity sensors 12a, 12b, 12c, 12d; air conditioning room temperature sensor 14; air conditioning room humidity sensor 15; air conditioner 9; humidifier 16; dehumidifier 17; input and output terminal 19; and system controller 10. Note that the number of each of exhaust fans, conveying fans, and circulation fans may be at least one.

Ventilation and air conditioning system 20 is installed in general housing 1 which is an example of a building. General housing 1 includes a plurality of (four in the present embodiment) rooms 2a to 2d and at least one air conditioning room 18 independent of rooms 2a to 2d. Here, general housing 1 (house) is a living space provided as a place where residents live out their private lives. Examples of general configuration of rooms include a living room, a dining room, a bedroom, a private room, and a child's room. Moreover, the rooms provided by ventilation and air conditioning system 20 may include a toilet, a bathroom, a washroom, a dressing room, and the like.

In air conditioning room 18, outdoor air is taken into air conditioning room 18 by outdoor air supply fan 4, and is mixed with the air conveyed from rooms 2a to 2d by circulation fans 6a to 6d. The air in air conditioning room 18 is conditioned by controlling the temperature and humidity of the air by air conditioner 9, humidifier 16, and dehumidifier 17 disposed in air conditioning room 18. The air conditioned in air conditioning room 18 is conveyed to rooms 2a to 2d by conveying fans 3a to 3d.

The air in rooms 2a to 2d is conveyed to air conditioning room 18 by circulation fans 6a to 6d, and is exhausted from the inside of rooms 2a to 2d to the outside of general housing 1 as outdoor air by exhaust fans 5a to 5d. Ventilation and air conditioning system 20 performs ventilation of the first type of ventilation system by controlling the supply air volume of outdoor air supply fan 4 such that outdoor air is taken into the rooms while controlling the exhaust air volume of exhaust fans 5a to 5d such that outdoor air is exhausted from the rooms. The supply air volume of outdoor air supply fan 4 is controlled while being linked to the exhaust air volumes of exhaust fans 5a to 5d.

Outdoor air supply fan 4 is a fan which supplies outdoor air to the inside of rooms of general housing 1, and corresponds to an air supply fan, the air supply function of a heat exchange fan, and the like. As described above, the outdoor air taken by outdoor air supply fan 4 is taken into air conditioning room 18. The supply air volume of outdoor air supply fan 4 can be set by a plurality of levels, and is set according to the exhaust air volumes of exhaust fans 5a to 5d, as described later.

Exhaust fans 5a to 5d are fans which exhaust part of the air in corresponding rooms 2a to 2d as outdoor air, and each of exhaust fans 5a to 5d corresponds to a ceiling-mounted ventilation fan, a wall-mounted ventilation fan, a range hood, the exhaust function of a heat exchange fan, and the like. Exhaust fan 5a is disposed in room 2a, exhaust fan 5b is disposed in room 2b, exhaust fan 5c is disposed in room 2c, and exhaust fan 5d is disposed in room 2d.

Each of exhaust fans 5a to 5d is configured such that the exhaust air volume can be set by a plurality of levels. During normal operations, each of exhaust fans 5a to 5d is controlled so as to have a preset exhaust air volume. The exhaust air volume is controlled for each of exhaust fans 5a to 5d according to the user settings or the values obtained by the various sensors.

Conveying fans 3a to 3d are disposed in air conditioning room 18 so as to correspond to rooms 2a to 2d. The air in air conditioning room 18 is conveyed to room 2a by conveying fan 3a, is conveyed to room 2b by conveying fan 3b, is conveyed to room 2c by conveying fan 3c, and is conveyed to room 2d by conveying fan 3d.

Circulation fan 6a is disposed in room 2a, circulation fan 6b is disposed in room 2b, circulation fan 6c is disposed in room 2c, and circulation fan 6d is disposed in room 2d. Part of the air in each of rooms 2a to 2d is conveyed to air conditioning room 18 by corresponding circulation fans 6a to 6d.

Air conditioner 9, humidifier 16 and dehumidifier 17 correspond to an air handling unit, and control air conditioning in air conditioning room 18. Air conditioner 9 cools or heats the air in air conditioning room 18 such that the temperature of the air in air conditioning room 18 is equal to a set target temperature (air conditioning room target temperature).

Humidifier 16 humidifies the air in air conditioning room 18 such that when the humidity of the air in air conditioning room 18 is less than the set target humidity (air conditioning room target humidity), the humidity is equal to the air conditioning room target humidity.

Dehumidifier 17 dehumidifies the air in air conditioning room 18 such that when the humidity of the air in air conditioning room 18 is greater than the set target humidity (air conditioning room target humidity), the humidity is equal to the air conditioning room target humidity.

Room temperature sensor 11a is disposed in room 2a, room temperature sensor 11b is disposed in room 2b, room temperature sensor 11c is disposed in room 2c, and room temperature sensor 11d is disposed in room 2d. Room temperature sensors 11a to 11d are sensors which obtain the room temperatures of corresponding rooms 2a to 2d, and transmit the obtained room temperatures to system controller 10.

Room humidity sensor 12a is disposed in room 2a, room humidity sensor 12b is disposed in room 2b, room humidity sensor 12c is disposed in room 2c, and room humidity sensor 12d is disposed in room 2d. Room humidity sensors 12a to 12d are sensors which obtain the room humidities of corresponding rooms 2a to 2d, and transmit the obtained room humidities to system controller 10.

Air conditioning room temperature sensor 14 is a sensor which obtains the temperature of the air in air conditioning room 18, and transmits the obtained temperature to system controller 10. Air conditioning room humidity sensor 15 is a sensor which obtains the humidity of the air in air conditioning room 18, and transmits the obtained humidity to system controller 10

System controller 10 is a controller which entirely controls ventilation and air conditioning system 20. System controller 10 is communicatively connected to outdoor air supply fan 4, exhaust fans 5a to 5d, conveying fans 3a to 3d, circulation fans 6a to 6d, room temperature sensors 11a to 11d, room humidity sensors 12a to 12d, air conditioning room temperature sensor 14, air conditioning room humidity sensor 15, air conditioner 9, humidifier 16, and dehumidifier 17 by wireless communication.

System controller 10 controls outdoor air supply fan 4 and exhaust fans 5a to 5d in a linked manner, such as setting the supply air volume of outdoor air supply fan 4 according to the exhaust air volumes of exhaust fans 5a to 5d. Accordingly, general housing 1 is ventilated by the first type of ventilation system.

Moreover, system controller 10 controls air conditioner 9, humidifier 16, and dehumidifier 17 as an air handling unit based on the temperature and the humidity of the air in air conditioning room 18 obtained by air conditioning room temperature sensor 14 and air conditioning room humidity sensor 15, such that at least one of the temperature and the humidity in air conditioning room 18 is equal to at least one of the air conditioning room target temperature and the air conditioning room target humidity set to air conditioning room 18.

Moreover, system controller 10 sets the air volumes of conveying fans 3a to 3d and circulation fans 6a to 6d according to at least one of the room temperatures and the room humidities of rooms 2a to 2d obtained by room temperature sensors 11a to 11d and room humidity sensors 12a to 12d, and at least one of the target temperature (room target temperature) and the target humidity (room target humidity) set to each of rooms 2a to 2d. Note that the items detected for each of rooms 2a to 2d may be other than temperature and humidity, and, for example, odor, dust, smoke, and the like may be detected.

As a result, the air conditioned in air conditioning room 18 is conveyed to rooms 2a to 2d at the air volumes set to conveying fans 3a to 3d, and the air in rooms 2a to 2d is conveyed to air conditioning room 18 at the air volumes set to circulation fans 6a to 6d. Accordingly, at least one of the room temperature and the room humidity of each of rooms 2a to 2d is controlled so as to be equal to at least one of the room target temperature and the room target humidity.

Here, system controller 10 is wirelessly connected to outdoor air supply fan 4, exhaust fans 5a to 5d, conveying fans 3a to 3d, circulation fans 6a to 6d, room temperature sensors 11a to 11d, room humidity sensors 12a to 12d, air conditioning room temperature sensor 14, air conditioning room humidity sensor 15, air conditioner 9, humidifier 16, and dehumidifier 17, so that complicated wiring work can be eliminated. However, all of them, or system controller 10 and part of the above elements may be communicatively connected via wired communication.

System controller 10 is disposed as, for example, a microcomputer. The microcomputer includes a central processing unit (CPU), a random access memory (RAM), a read only memory (ROM), and a hard disk drive (HDD). The microcomputer also includes a wired communication module and a wireless communication module. The CPU, RAM, ROM, and HDD are interconnected via an internal bus. The CPU controls the operation of each device by, for example, using the RAM as a work area, executing a program stored in the ROM, and exchanging data and commands with the HDD and each device based on the execution result.

Input and output terminal 19 is communicably connected to system controller 10 by wireless communication. Input and output terminal 19 receives input of information necessary for constructing ventilation and air conditioning system 20 and stores the input in system controller 10, and obtains the state of ventilation and air conditioning system 20 from system controller 10 and displays the obtained state. Input and output terminal 19 is, for example, a mobile information terminal, such as a mobile phone, a smartphone, or a tablet.

Input and output terminal 19 does not always have to be connected to system controller 10 by wireless communication, but may be communicatively connected to system controller 10 by wired communication. In this case, input and output terminal 19 may be realized by, for example, a wall-mounted remote controller.

Figure 2:
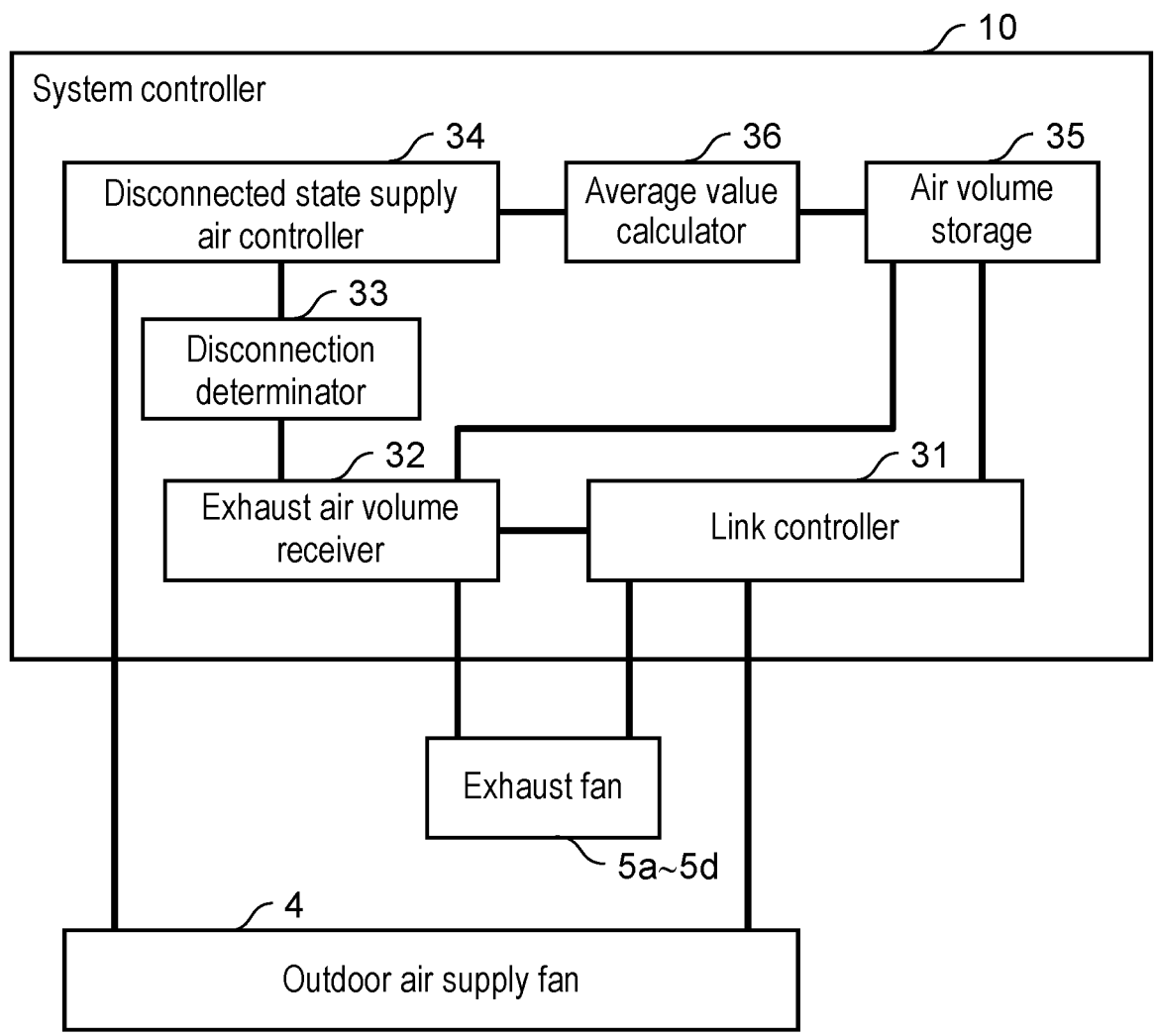
FIG. 2 is a schematic functional block diagram of a system controller of the ventilation and air conditioning system.

Next, each function of system controller 10 will be described with reference to FIG. 2. FIG. 2 is a schematic functional block diagram of system controller 10.

System controller 10 at least includes link controller 31, exhaust air volume receiver 32, disconnection determinator 33, disconnected state supply air controller 34, average value calculator 36, and air volume storage 35.

Link controller 31 controls outdoor air supply fan 4 and exhaust fans 5a to 5d in a linked manner. Specifically, link controller 31 sets the exhaust air volume of each of exhaust fans 5a to 5d according to a preset air volume, user settings, values obtained by various sensors, and the like.

Link controller 31 also refers to the exhaust air volume in the actual operation of each of exhaust fans 5a to 5d obtained by exhaust air volume receiver 32 every predetermined period. Link controller 31 then sets the supply air volume of outdoor air supply fan 4 so as to be equal to the sum of the actual exhaust air volumes of exhaust fans 5a to 5d. Accordingly, the air quality and the air volume in general housing 1 can be maintained.

Exhaust air volume receiver 32 queries exhaust fans 5a to 5d about the exhaust air volumes in the actual operations every predetermined period (for example, one minute), and obtains the actual exhaust air volumes from exhaust fans 5a to 5d. The obtained exhaust air volumes are used by link controller 31. The presence or absence (success or failure) of the receptions of the exhaust air volumes by exhaust air volume receiver 32 is used by disconnection determinator 33.

Air volume storage 35 stores the history of the exhaust air volume of each of exhaust fans 5a to 5d obtained by exhaust air volume receiver 32. Air volume storage 35 according to Embodiment 1 stores the history of the exhaust air volume for each of exhaust fans 5a to 5d, but may store the history of the total value of the exhaust air volumes of exhaust fans 5a to 5d. Moreover, the history of the exhaust air volume which can be stored in air volume storage 35 may be limited to the immediately preceding predetermined period (for example, 6 hours), and the history exceeding the predetermined period may be deleted.

Average value calculator 36 calculates the average value of the exhaust air volumes of each of exhaust fans 5a to 5d from the history of the exhaust air volume of each of exhaust fans 5a to 5d stored in air volume storage 35. Average value calculator 36 may calculate the average value of the sum of the exhaust air volumes of exhaust fans 5a to 5d at the respective times from the histories of the exhaust air volumes of exhaust fans 5a to 5d stored in air volume storage 35. Average value calculator 36 according to Embodiment 1 calculates the average value of the exhaust air volumes using all the histories of the exhaust air volumes stored in air volume storage 35. However, average value calculator 36 may calculate the average value of the exhaust air volumes during an immediately preceding predetermined period (for example, one hour) in the histories of the exhaust air volumes stored in air volume storage 35.

Disconnection determinator 33 determines whether exhaust air volume receiver 32 is in a disconnected state where a signal indicating the exhaust air volume (exhaust air volume signal) cannot be received from any one of exhaust fans 5a to 5d.

Disconnected state supply air controller 34 controls outdoor air supply fan 4 such that the supply air volume is equal to a predetermined air volume, when disconnection determinator 33 determines that any one of exhaust fans 5a to 5d is in the disconnected state. Disconnected state supply air controller 34 sets, as a predetermined air volume, the sum of the average values of the exhaust air volumes of exhaust fans 5a to 5d calculated by average value calculator 36.

When disconnection determinator 33 determines that exhaust air volume receiver 32 is not in the disconnected state, system controller 10 causes link controller 31 to set the supply air volume to outdoor air supply fan 4 so as to be equal to the sum of the actual exhaust air volumes of exhaust fans 5a to 5d.

Figure 3:
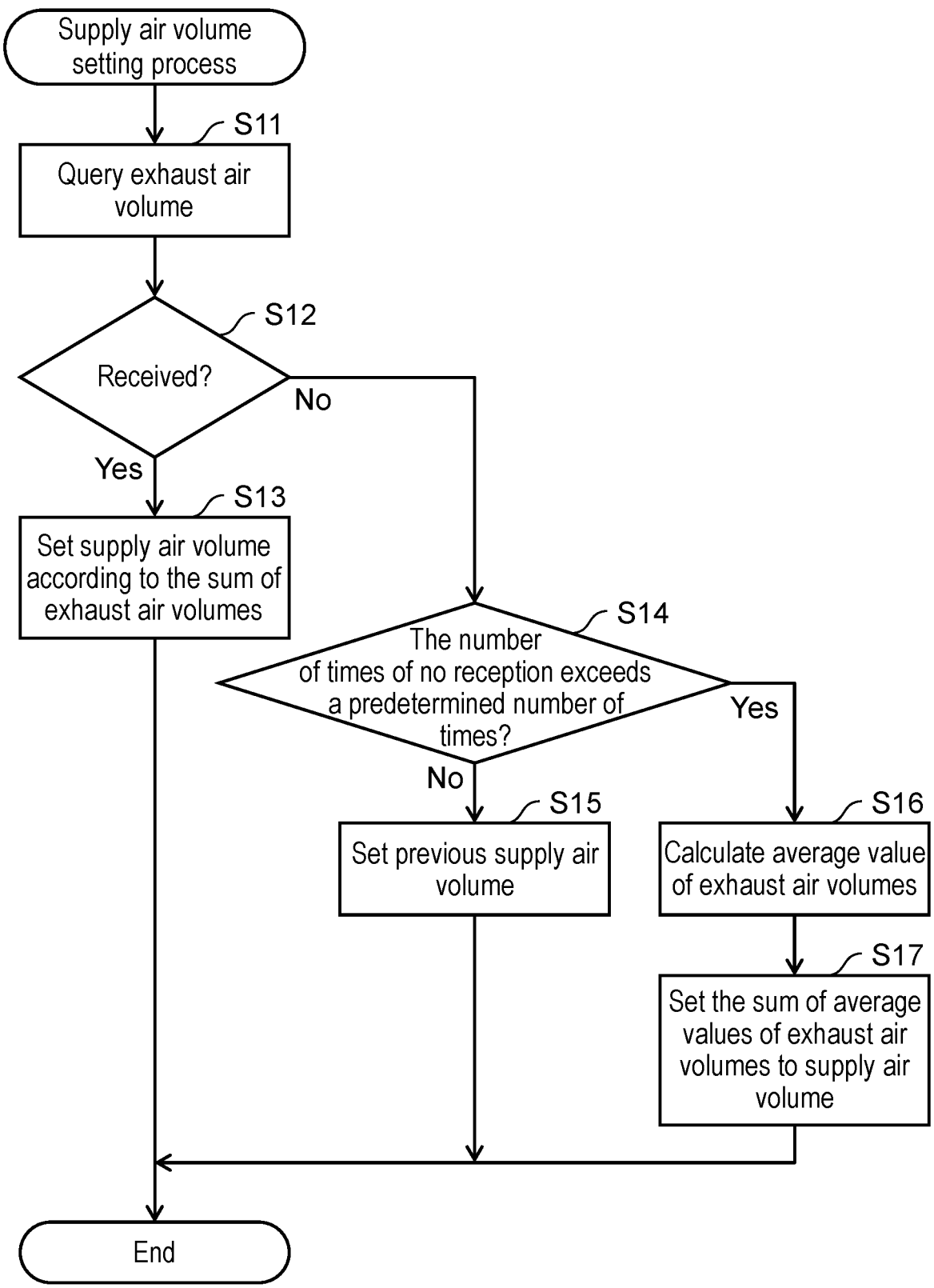
FIG. 3 is a flowchart of a supply air volume setting process executed by the system controller.

Next, a supply air volume setting process executed by system controller 10 will be described with reference to FIG. 3. FIG. 3 is a flowchart of the supply air volume setting process executed by system controller 10. The supply air volume setting process is executed by system controller 10 every predetermined period (for example, one minute) to control the supply air volume of outdoor air supply fan 4.

First, system controller 10 executes the supply air volume setting process to query each of exhaust fans 5a to 5d about the exhaust air volume in the actual operation (step S11). The process in step S11 is executed by exhaust air volume receiver 32.

Next, system controller 10 determines whether or not an exhaust air volume signal indicating the actual exhaust air volume was received from each of exhaust fans 5a to 5d as a result of the process in step S11 (Step S12).

When the result of the determination in step S12 indicates that the exhaust air volume signal was received (step S12: Yes), system controller 10 sets the supply air volume of outdoor air supply fan 4 so as to be equal to the sum of the actual exhaust air volumes of exhaust fans 5a to 5d (step S13), and ends the supply air volume setting process. By the process in step S13, the air quality and the air volume in general housing 1 can be maintained. The process in step S13 is executed by link controller 31.

The actual exhaust air volume obtained from each of exhaust fans 5a to 5d is stored in air volume storage 35 as the history of the exhaust air volume.

On the other hand, when the result of the determination in step S12 indicates that the exhaust air volume signal was not received from any one of exhaust fans 5a to 5d (step S12: No), system controller 10 determines whether or not the number of times that the signal could not be continuously received exceeds a predetermined number of times (for example, twice) (step S14).

When it is determined that the number of times that the exhaust air volume signal could not be continuously received exceeds the predetermined number of times (step S14: Yes), system controller 10 determines a disconnected state where the exhaust air volume signal cannot be received from any one of exhaust fans 5a to 5d, and advances the process to step S16. By checking the reception of the exhaust air volume signal a plurality of times as in the process of step S14, the case where the exhaust air volume signal could not be temporarily received from any one of exhaust fans 5a to 5d due to the influence of noise or the like can be excluded from the disconnected state.

Note that the processes in step S12 and step S14 are executed by disconnection determinator 33. Moreover, in the process of step S14, it may be that system controller 10 determines whether or not the number of times that the exhaust air volume signal could not be continuously received is greater than or equal to a predetermined number of times. When the number of times that the exhaust air volume signal could not be continuously received is determined to be greater than or equal to the predetermined number of times, system controller 10 may determine a disconnected state, and advance the process to step S16.

System controller 10 calculates the average value of the exhaust air volumes of each of exhaust fans 5a to 5d based on the history of the exhaust air volume of each of exhaust fans 5a to 5d stored in air volume storage 35 (step S16). The process in step S16 is executed by average value controller 36.

System controller 10 then sets the supply air volume of outdoor air supply fan 4 so as to be equal to the sum of the average values of the exhaust air volumes of exhaust fans 5a to 5d calculated in the process of step S16 (step S17), and ends the supply air volume setting process. The process in step S17 is executed by disconnected state supply air controller 34.

System controller 10 does not stop the operation of outdoor air supply fan 4, but sets the supply air volume of outdoor air supply fan 4 to a predetermined air volume by the process of step S17 when in a disconnected state where the exhaust air volume signal cannot be received from any one of exhaust fans 5a to 5d. Accordingly, ventilation and air conditioning system 20 is capable of maintaining the supply and exhaust air balance as the first type of ventilation system under a certain rule. As a result, even when the linked connection between exhaust fans 5a to 5d and outdoor air supply fan 4 is cut off, ventilation and air conditioning system 20 is capable of stably performing ventilation.

The supply air volume of outdoor air supply fan 4 set in this case is set based on the history of the actual exhaust air volume of each of exhaust fans 5a to 5d before any one of exhaust fans 5a to 5d is turned into the disconnected state. In other words, when the exhaust air volume signal could not be received from any one of exhaust fans 5a to 5d, the actual exhaust air volumes of exhaust fans 5a to 5d are predicted based on the histories of exhaust fans 5a to 5d before the disconnected state, and the supply air volume corresponding to the predicted exhaust air volumes of exhaust fans 5a to 5d is set to outdoor air supply fan 4. Accordingly, ventilation and air conditioning system 20 is capable of maintaining the supply and exhaust air balance between exhaust fans 5a to 5d and outdoor air supply fan 4 more accurately.

In particular, ventilation and air conditioning system 20 calculates the average value of the exhaust air volume of each of exhaust fans 5a to 5d from the history of the actual exhaust air volume of each of exhaust fans 5a to 5d before the disconnected state, and sets the supply air volume of outdoor air supply fan 4 so as to be equal to the sum of the average values. Accordingly, ventilation and air conditioning system 20 is capable of setting the supply air volume of outdoor air supply fan 4 so as to be close to the air volume corresponding to the actual exhaust air volumes of exhaust fans 5a to 5d in the disconnected state. As a result, ventilation and air conditioning system 20 is capable of maintaining the supply and exhaust air balance between exhaust fans 5a to 5d and outdoor air supply fan 4 more accurately.

Moreover, as described above, ventilation and air conditioning system 20 according to Embodiment 1 may calculate the average value of the exhaust air volumes of each of exhaust fans 5a to 5d for an immediately preceding certain period in the history of the actual exhaust air volume of each of exhaust fans 5a to 5d before the disconnected state, and set the supply air volume of outdoor air supply fan 4 so as to be equal to the sum of the average values. By doing so, ventilation and air conditioning system 20 is capable of setting the supply air volume of outdoor air supply fan 4 so as to be close to the air volume corresponding to the actual exhaust air volumes of exhaust fans 5a to 5d immediately before the disconnected state. As a result, ventilation and air conditioning system 20 is capable of maintaining the supply and exhaust air balance between exhaust fans 5a to 5d and outdoor air supply fan 4 more accurately.

On the other hand, when the determination in step S14 indicates that the number of times that the exhaust air volume signal could not be continuously received does not exceed the predetermined number of times (is less than or equal to the predetermined number of times) (step S14: No), system controller 10 determines that a disconnected state is not established, and advances the process to step S15. System controller 10 sets the supply air volume set by the previously executed supply air volume setting process as the supply air volume of outdoor air supply fan 4 (Step S15).

By the process of step S15, even when system controller 10 cannot temporarily receive the exhaust air volume signal from any one of exhaust fans 5a to 5d, system controller 10 sets, to outdoor air supply fan 4, the supply air volume set by the previously executed supply air volume setting process. Accordingly, ventilation and air conditioning system 20 is capable of maintaining the supply and exhaust air balance as the first type of ventilation system under a certain rule. As a result, even when the linked connection between exhaust fans 5a to 5d and outdoor air supply fan 4 is cut off, ventilation can be stably performed.

As described above, in ventilation and air conditioning system 20 according to Embodiment 1, when disconnection determinator 33 determines a disconnected state where exhaust air volume receiver 32 fails to receive the exhaust air volume signal, outdoor air supply fan 4 is controlled at a predetermined air volume by disconnected state supply air controller 34.

Specifically, air volume storage 35 stores the history of the actual exhaust air volume of each of exhaust fans 5a to 5d. When any one of exhaust fans 5a to 5d is turned into a disconnected state, average value calculator 36 calculates the average value of the exhaust air volumes of each of exhaust fans 5a to 5d before the disconnected state based on the history of the exhaust air volumes of exhaust fans 5a to 5d before the disconnected state. The sum of the calculated average values of the exhaust air volumes is set by disconnected state supply air controller 34 to outdoor air supply fan 4 as a predetermined air volume.

As a result, even when the linked connection between exhaust fans 5a to 5d and outdoor air supply fan 4 is cut off, ventilation can be stably performed.

Embodiment 2

Next, ventilation and air conditioning system 120 according to Embodiment 2 will be described with reference to FIG. 4 and FIG. 5.

When disconnection determinator 33 determines a disconnected state where exhaust air volume receiver 32 fails to receive the exhaust air volume signal, ventilation and air conditioning system 20 sets the supply air volume of outdoor air supply fan 4 based on the history of the actual exhaust air volume of each of exhaust fans 5a to 5d. More specifically, based on the history of the exhaust air volume of each of exhaust fans 5a to 5d stored in air volume storage 35 before any one of exhaust fans 5a to 5d is turned into the disconnected state, average value calculator 36 calculates the average value of the exhaust air volumes of each of exhaust fans 5a to 5d. Disconnected state supply air controller 34 then sets the sum of the calculated average values of the exhaust air volumes as the supply air volume of outdoor air supply fan 4.

On the other hand, when disconnection determinator 33 determines a disconnected state where exhaust air volume receiver 32 fails to receive the exhaust air volume signal, ventilation and air conditioning system 120 according to Embodiment 2 sets the sum of the maximum exhaust air volumes in the history of each of exhaust fans 5a to 5d to the supply air volume of outdoor air supply fan 4. Specifically, based on the history of the exhaust air volume of each of exhaust fans 5a to 5d stored in air volume storage 35 before any one of exhaust fans 5a to 5d is turned into the disconnected state, the maximum exhaust air volume in the history is calculated for each of exhaust fans 5a to 5d. In ventilation and air conditioning system 120, the sum of the calculated maximum exhaust air volumes of exhaust fans 5a to 5d is set to the supply air volume of outdoor air supply fan 4 as a predetermined air volume.

Hereinafter, ventilation and air conditioning system 120 will be described focusing on differences from ventilation and air conditioning system 20. The same structural elements as those of ventilation and air conditioning system 20 are denoted by the same reference numerals, and the descriptions thereof will be omitted.

Figure 4:
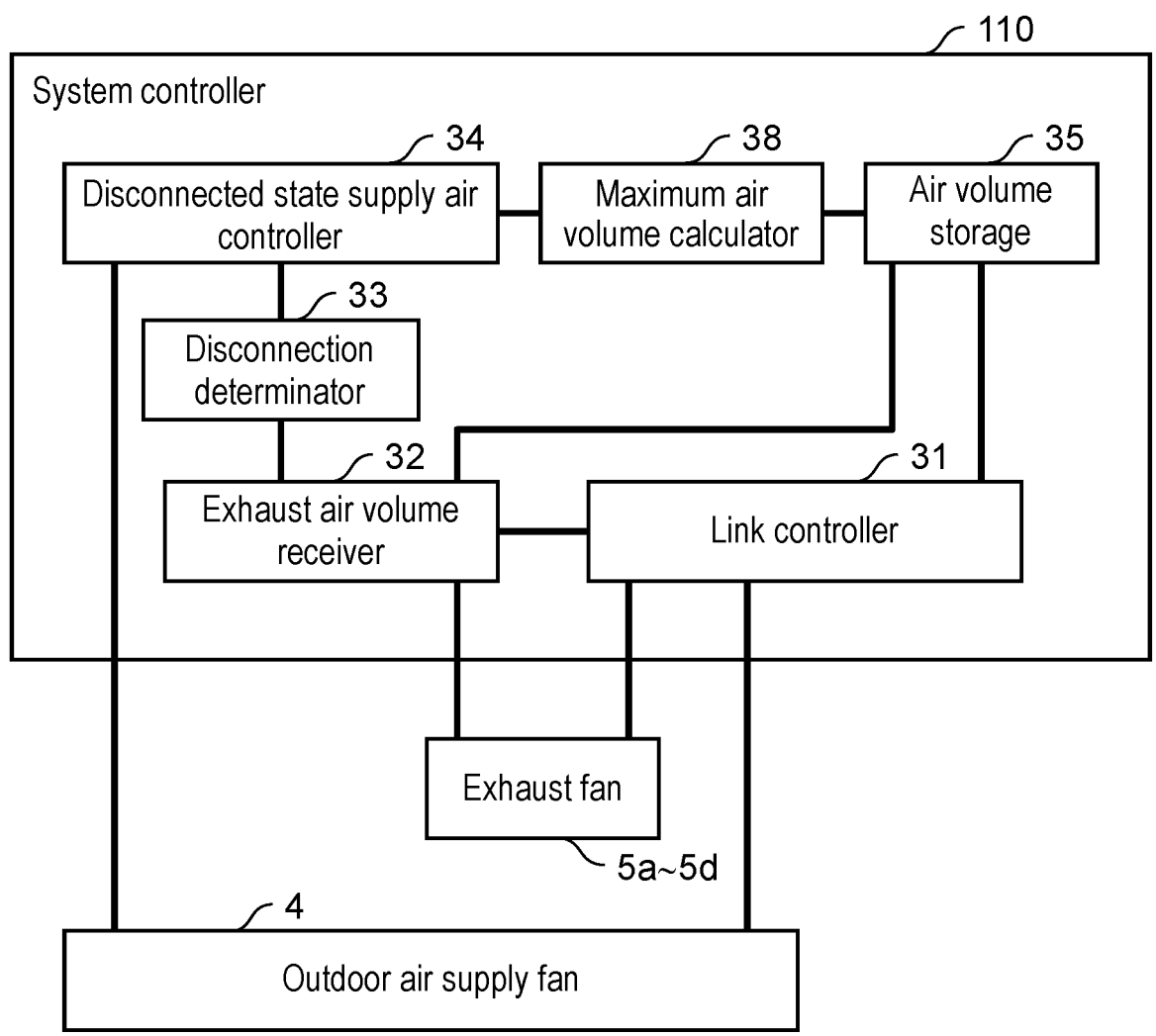
FIG. 4 is a schematic functional block diagram of a system controller of a ventilation and air conditioning system according to Embodiment 2 of the present disclosure.
Figure 5:
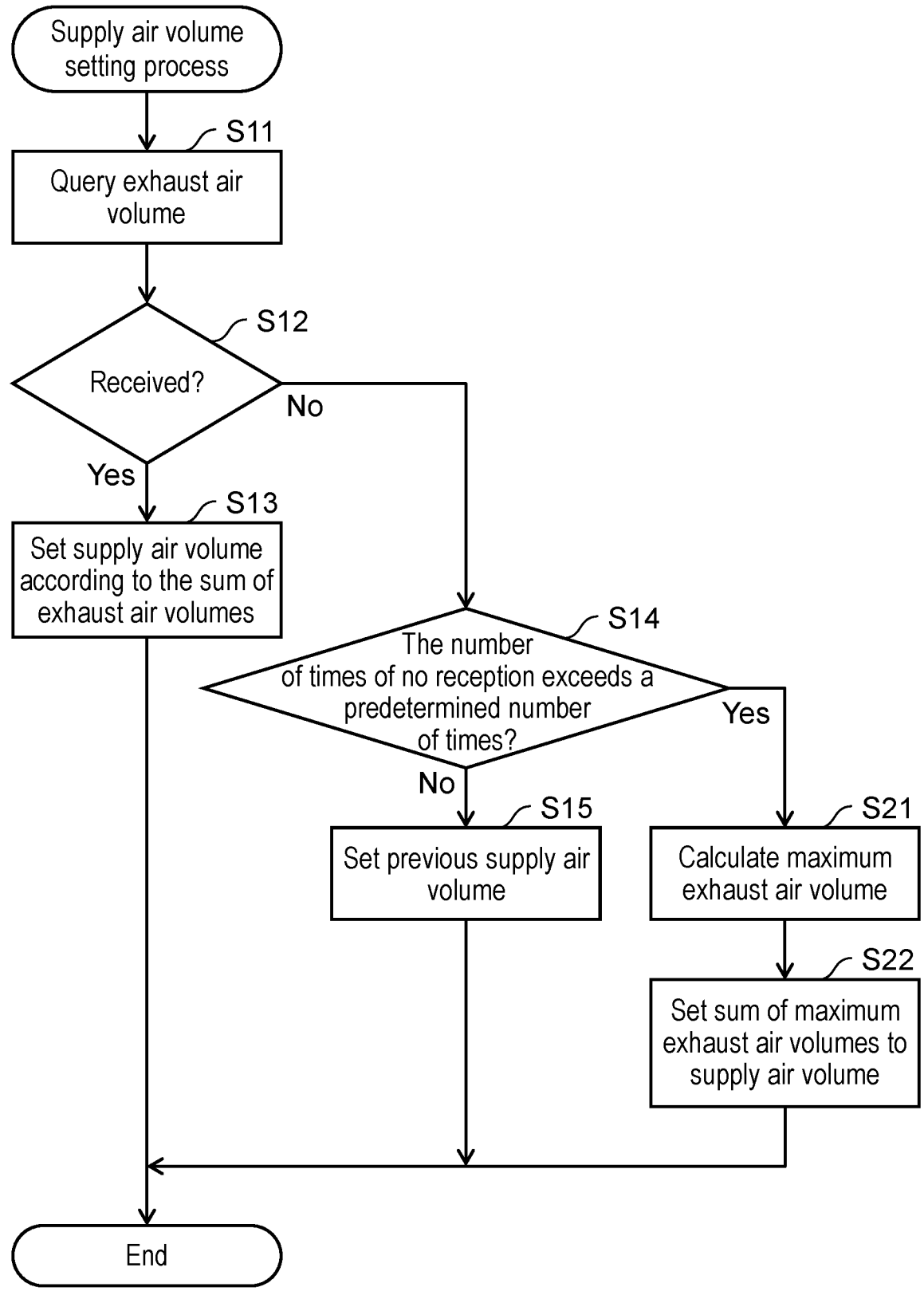
FIG. 5 is a flowchart of a supply air volume setting process executed by the system controller.

FIG. 4 is a schematic functional block diagram of system controller 110 of ventilation and air conditioning system 120 according to Embodiment 2 of the present disclosure.

System controller 110 includes maximum air volume calculator 38 instead of average value calculator 36 of system controller 10.

Maximum air volume calculator 38 calculates the maximum exhaust air volume for each of exhaust fans 5a to 5d from the history of the exhaust air volume of each of exhaust fans 5a to 5d stored in air volume storage 35. Maximum air volume calculator 38 calculates the maximum exhaust air volume for each of exhaust fans 5a to 5d from all the histories of the exhaust air volumes stored in air volume storage 35. However, maximum air volume calculator 38 may calculate, for each of exhaust fans 5a to 5d, the maximum exhaust air volume in an immediately preceding certain period (for example, one hour) in the history of the exhaust air volume stored in air volume storage 35.

The maximum exhaust air volume of each of exhaust fans 5a to 5d calculated by maximum air volume calculator 38 is used by disconnected state supply air controller 34. In other words, when disconnection determinator 33 determines a disconnected state, disconnected state supply air controller 34 sets the sum of the maximum exhaust air volumes calculated for exhaust fans 5a to 5d by maximum air volume calculator 38 to the supply air volume of outdoor air supply fan 4.

Next, a supply air volume setting process executed by system controller 110 will be described with reference to FIG. 5. FIG. 5 is a flowchart of the supply air volume setting process executed by system controller 110.

The difference between the supply air volume setting process executed by system controller 110 and the supply air volume setting process executed by system controller 10 is that the processes of step S21 and step S22 are executed instead of the processes of step S16 and step S17.

In other words, when the result of the determination in step S12 indicates that the exhaust air volume signal was not received from any one of exhaust fans 5a to 5d (step S12: No) and the result of the determination in step S14 indicates that the number of times that the exhaust air volume signal could not be continuously received exceeds a predetermined number of times (step S14: Yes), system controller 110 determines a disconnected state where the exhaust air volume signal cannot be received from any one of exhaust fans 5a to 5d, and executes the processes of step S21 and step S22.

In the process of step S21, system controller 110 calculates, for each of exhaust fans 5a to 5d, the maximum exhaust air volume from the history of the exhaust air volume of each of exhaust fans 5a to 5d stored in air volume storage 35. The process of step S21 is executed by maximum air volume calculator 38.

System controller 110 then sets the supply air volume of outdoor air supply fan 4 so as to be equal to the sum of the maximum exhaust air volumes of exhaust fans 5a to 5d calculated in the process of step S21 (step S22), and ends the supply air volume setting process. The process in step S22 is executed by disconnected state supply air controller 34.

As described above, in ventilation and air conditioning system 120, too, when in a disconnected state where the exhaust air volume signal cannot be received from any one of exhaust fans 5a to 5d, the operation of outdoor air supply fan 4 is not stopped, but the supply air volume of outdoor air supply fan 4 is set to a predetermined air volume. Accordingly, ventilation and air conditioning system 120 is capable of maintaining the supply and exhaust air balance as the first type of ventilation system under a certain rule. As a result, even when the linked connection between exhaust fans 5a to 5d and outdoor air supply fan 4 is cut off, ventilation and air conditioning system 120 is capable of stably performing ventilation.

In particular, ventilation and air conditioning system 120 calculates the maximum exhaust air volume of each of exhaust fans 5a to 5d from the history of the actual exhaust air volume of each of exhaust fans 5a to 5d before the disconnected state. Then, the supply air volume of outdoor air supply fan 4 is set so as to be equal to the sum of the maximum exhaust air volumes. Accordingly, ventilation and air conditioning system 120 is capable of maintaining the supply and exhaust air balance between exhaust fans 5a to 5d and outdoor air supply fan 4 while positively pressurizing general housing 1.

Moreover, as described above, ventilation and air conditioning system 120 may calculate, for each of exhaust fans 5a to 5d, the maximum exhaust air volume for an immediately preceding certain period in the history of the actual exhaust air volume of each of exhaust fans 5a to 5d before the disconnected state. Ventilation and air conditioning system 120 then may set the supply air volume of outdoor air supply fan 4 so as to be equal to the sum of the maximum exhaust air volumes. By doing so, ventilation and air conditioning system 120 is capable of setting the supply air volume of outdoor air supply fan 4 so as to be close to the air volume corresponding to the actual exhaust air volumes of exhaust fans 5a to 5d immediately before the disconnected state. As a result, ventilation and air conditioning system 120 is capable of maintaining the supply and exhaust air balance between exhaust fans 5a to 5d and outdoor air supply fan 4 accurately.

As to the other aspects, ventilation and air conditioning system 120 has the same configuration as ventilation and air conditioning system 20, so that the same advantageous effects can be provided.

Embodiment 3

Next, ventilation and air conditioning system 220 according to Embodiment 3 will be described with reference to FIG. 6 and FIG. 7.

Ventilation and air conditioning system 220 sets the air volume which is a predetermined certain air volume and which is different from the maximum supply air volume of outdoor air supply fan 4 to the supply air volume of outdoor air supply fan 4 as a predetermined air volume when disconnection determinator 33 determines a disconnected state where exhaust air volume receiver 32 fails to receive the exhaust air volume signal.

Hereinafter, ventilation and air conditioning system 220 will be described focusing on differences from ventilation and air conditioning system 20. The same structural elements as those of ventilation and air conditioning system 20 are denoted by the same reference numerals, and the descriptions thereof will be omitted.

Figure 6:
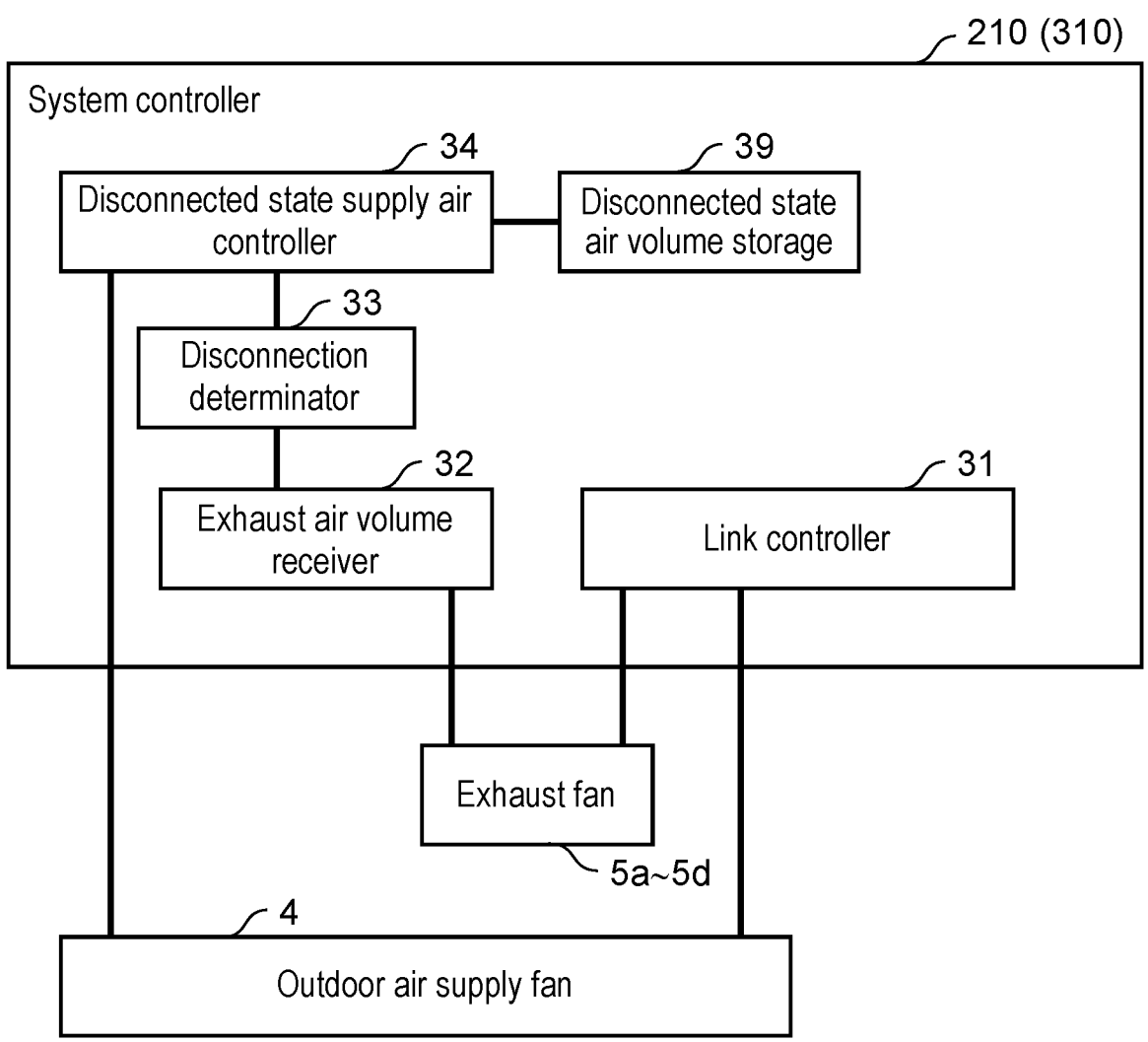
FIG. 6 is a schematic functional block diagram of a system controller of a ventilation and air conditioning system according to Embodiment 3 of the present disclosure.
Figure 7:
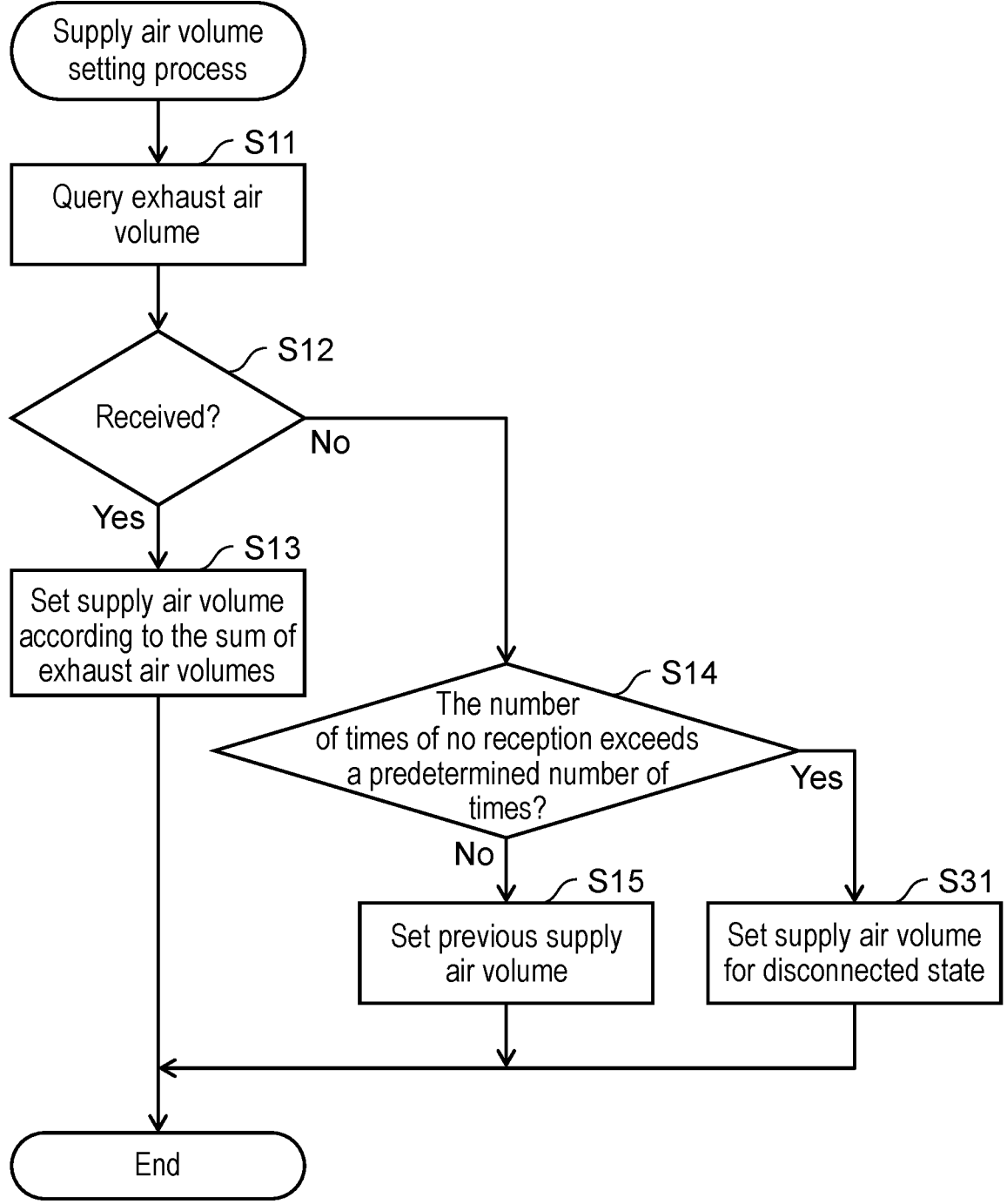
FIG. 7 is a flowchart of a supply air volume setting process executed by the system controller.

FIG. 6 is a schematic functional block diagram of system controller 210 of ventilation and air conditioning system 220 according to Embodiment 3 of the present disclosure.

System controller 210 includes disconnected state air volume storage 39 instead of air volume storage 35 and average value calculator 36 of system controller 10.

Disconnected state air volume storage 39 stores the air volume which is a predetermined supply air volume of outdoor air supply fan 4 to be used when any one of exhaust fans 5a to 5d is in a disconnected state and which is different from the maximum supply air volume of outdoor air supply fan 4. The supply air volume stored in disconnected state air volume storage 39 is used by disconnected state supply air controller 34.

In other words, when disconnection determinator 33 determines a disconnected state, disconnected state supply air controller 34 sets the supply air volume stored in disconnected state air volume storage 39 as the supply air volume of outdoor air supply fan 4.

Next, with reference to FIG. 7, a supply air volume setting process executed by system controller 210 according to Embodiment 3 will be described. FIG. 7 is a flowchart of the supply air volume setting process executed by system controller 210.

The difference between the supply air volume setting process executed by system controller 210 and the supply air volume setting process executed by system controller 10 is that the process of step S31 is executed instead of the processes of step S16 and step S17.

In other words, when the result of the determination in step S12 indicates that the exhaust air volume signal was not received from any one of exhaust fans 5a to 5d (step S12: No) and the result of the determination in step S14 indicates that the number of times that the exhaust air volume signal could not be continuously received exceeds a predetermined number of times (step S14: Yes), system controller 210 determines a disconnected state where the exhaust air volume signal cannot be received from any one of exhaust fans 5a to 5d, and executes the process of step S31.

System controller 210 sets the supply air volume stored in disconnected state air volume storage 39 as the supply air volume of outdoor air supply fan 4 in the process of step S31. In other words, when system controller 210 determines the disconnected state where exhaust air volume signal cannot be received from any one of exhaust fans 5a to 5d, the air volume, which is a predetermined supply air volume of outdoor air supply fan 4 to be used when in the disconnected state and which is different from the maximum supply air volume of outdoor air supply fan 4, is set as the supply air volume of outdoor air supply fan 4. The process in step S31 is executed by disconnected state supply air controller 34.

As described above, in ventilation and air conditioning system 220, too, in the disconnected state where the exhaust air volume signal cannot be received from any one of exhaust fans 5a to 5d, the operation of outdoor air supply fan 4 is not stopped, but the supply air volume of outdoor air supply fan 4 is set to a predetermined air volume. Accordingly, ventilation and air conditioning system 220 is capable of maintaining the supply and exhaust air balance as the first type of ventilation system under a certain rule. As a result, even when the linked connection between exhaust fans 5a to 5d and outdoor air supply fan 4 is cut off, ventilation and air conditioning system 220 is capable of stably performing ventilation.

In particular, ventilation and air conditioning system 220 according to Embodiment 3 sets a predetermined supply air volume to be used when in a disconnected state to outdoor air supply fan 4 as a predetermined air volume. This facilitates control of the setting of the supply air volume of outdoor air supply fan 4 when any one of exhaust fans 5a to 5d is in a disconnected state. Moreover, the supply air volume of outdoor air supply fan 4 set in this case is different from the maximum supply air volume of outdoor air supply fan 4, so that noise from outdoor air supply fan 4 can be reduced when any one of exhaust fans 5a to 5d is in a disconnected state.

As to the other aspects, ventilation and air conditioning system 220 has the same configuration as ventilation and air conditioning systems 20 and 120, so that the same advantageous effects can be provided.

Embodiment 4

Next, ventilation and air conditioning system 320 according to Embodiment 4 will be described with reference to FIG. 8.

The case has been described where ventilation and air conditioning system 220 sets the air volume which is a predetermined certain air volume and which is different from the maximum supply air volume of outdoor air supply fan 4 to the supply air volume of outdoor air supply fan 4 as a predetermined air volume when disconnection determination unit 33 determines a disconnected state where exhaust air volume receiver 32 fails to receive the exhaust air volume signal.

On the other hand, ventilation and air conditioning system 320 sets the maximum supply air volume of outdoor air supply fan 4 to the supply air volume of outdoor air supply fan 4 as a predetermined air volume when disconnection determinator 33 determines a disconnected state where exhaust air volume receiver 32 fails to receive the exhaust air volume signal.

Hereinafter, ventilation and air conditioning system 320 will be described focusing on the differences from ventilation and air conditioning system 220. The same structural elements as those of ventilation and air conditioning system 220 are denoted by the same reference numerals, and the descriptions thereof will be omitted.

Figure 8:
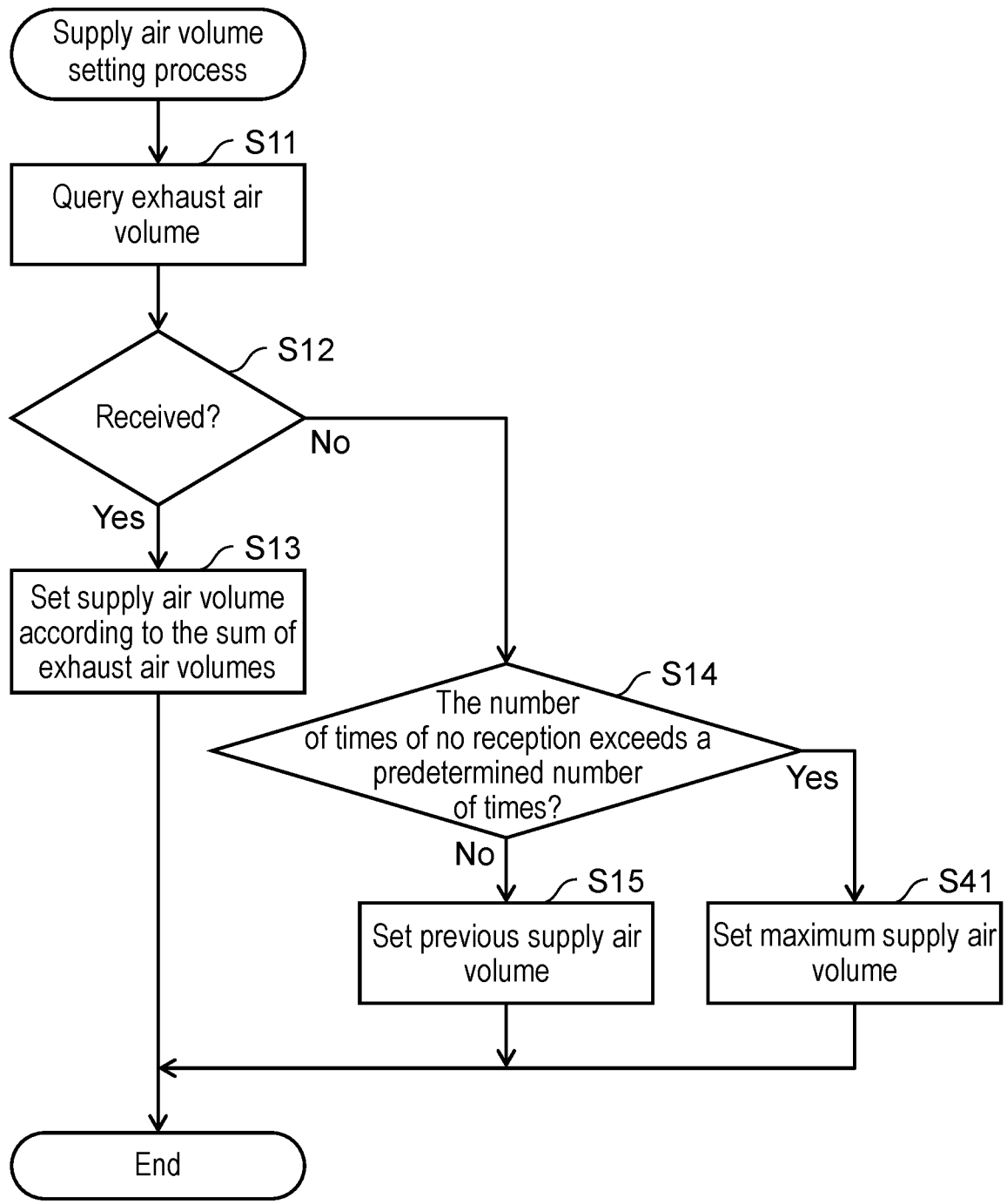
FIG. 8 is a flowchart of a supply air volume setting process executed by a system controller of a ventilation and air conditioning system according to Embodiment 4 of the present disclosure.

FIG. 8 is a flowchart of a supply air volume setting process executed by system controller 310 according to Embodiment 4.

In system controller 310 according to Embodiment 4, disconnected state air volume storage 39 stores the maximum supply air volume of outdoor air supply fan 4 as a predetermined supply air volume of outdoor air supply fan 4 to be used when any one of exhaust fans 5a to 5d is in a disconnected state.

In addition, the difference between the supply volume setting process performed by system controller 310 and the supply air volume setting process executed by system controller 210 is that the process of step S41 is executed.

In other words, when the result of the determination in step S12 indicates that the exhaust air volume signal was not received from any one of exhaust fans 5a to 5d (step S12: No) and the result of the determination in step S14 indicates that the number of times that the exhaust air volume signal could not be continuously received exceeds a predetermined number of times (step S14: Yes), system controller 310 determines a disconnected state where the exhaust air volume signal cannot be received from any one of exhaust fans 5a to 5d, and executes the process of step S41.

System controller 310 sets the maximum supply air volume of outdoor air supply fan 4 as the supply air volume of outdoor air supply fan 4 in the process of step S41. In other words, when the disconnected state is determined where the exhaust air volume signal cannot be received from any one of exhaust fans 5a to 5d, the maximum supply air volume of outdoor air supply fan 4 is set to outdoor air supply fan 4. In ventilation and air conditioning system 320, the process of step S41 is executed by disconnected state supply air controller 34.

As described above, in ventilation and air conditioning system 320, too, when in the disconnected state where the exhaust air volume signal cannot be received from any one of exhaust fans 5a to 5d, the operation of outdoor air supply fan 4 is not stopped, but the supply air volume of outdoor air supply fan 4 is set to a predetermined air volume. Accordingly, ventilation and air conditioning system 320 is capable of maintaining the supply and exhaust air balance as the first type of ventilation system under a certain rule. As a result, even when the linked connection between exhaust fans 5a to 5d and outdoor air supply fan 4 is cut off, ventilation and air conditioning system 320 is capable of stably performing ventilation.

In particular, ventilation and air conditioning system 320 sets the maximum supply air volume of outdoor air supply fan 4 to outdoor air supply fan 4 as a predetermined air volume. This facilitates control of the setting of the supply air volume of outdoor air supply fan 4 when any one of exhaust fans 5a to 5d is in a disconnected state. In addition, since the supply air volume of outdoor air supply fan 4 set in this case is the maximum supply air volume of outdoor air supply fan 4, ventilation can be stably performed while positively pressurizing the inside of general housing 1.

As to the other aspects, ventilation and air conditioning system 320 according to Embodiment 4 has the same configuration as any one of ventilation and air conditioning systems 20, 120, and 220 according to Embodiments 1 to 3, so that the same advantageous effects can be provided.

The present disclosure has been described above based on the embodiments. However, the present disclosure is not limited to the above embodiments, and it can be easily inferred that various improvements and modifications can be made without departing from the spirit of the present disclosure. For example, each embodiment may be modified by, for example, adding part or a plurality of parts of the structural elements in another embodiment to the embodiment or by replacing part or a plurality of parts of the structural elements in the embodiment with part or a plurality of parts of the structural elements in another embodiment. The numerical values given in the above embodiments are merely examples, and other numerical values can be naturally used.

In each of the above embodiments, the case has been described where system controllers 10, 110, 210, and 310 are provided independently of outdoor air supply fan 4 and exhaust fans 5a to 5d, and communication is performed between system controllers 10, 110, 210, and 310 and outdoor air supply fan 4, and between system controllers 10, 110, 210, 310 and exhaust fans 5a to 5d while system controllers 10, 110, 210, and 310 are functioning as hubs. However, outdoor air supply fan 4 and exhaust fans 5a to 5d may directly communicate with each other, and control may be performed in a linked manner. In this case, it may be that system controllers 10, 110, 210, and 310 are built in outdoor air supply fan 4, system controllers 10, 110, 210, and 310 are communicatively connected to exhaust fans 5a to 5d, and control as described in the above embodiments is performed while the fan provided in outdoor air supply fan 4 and exhaust fans 5a to 5d are linked to each other.

In the above embodiments, in the supply air volume setting process, when the result of the determination in step S12 indicates that the exhaust air volume signal was not received from any one of exhaust fans 5a to 5d (step S12: No), and the result of the determination in step S14 indicates that the number of times that the exhaust air volume signal could not be continuously received exceeds a predetermined number of times (step S14: Yes), a disconnected state is determined where the exhaust air volume signal cannot be received from any one of exhaust fans 5a to 5d. On the other hand, it may be that the process of step S14 is omitted, a disconnected state is determined when the result of the determination in step S12 indicates that the exhaust air volume signal was not received (step S12: No), and the processes of step S16 and step S17, the processes of step S21, and step S22, and the process of step S31, or the process of step S41 are executed.

In Embodiment 1, when at least one of exhaust fans 5a to 5d is determined to be in a disconnected state by the processes in step S12 and step S14, an average exhaust air volume of each of exhaust fans 5a to 5d is calculated based on the history of the air volume of each of exhaust fans 5a to 5d stored in air volume storage 35, and the sum of the average values is set to outdoor air supply fan 4 as a predetermined air volume. On the other hand, in the processes of step S12 and step S14, it may be that an exhaust fan which is in a disconnected state is determined from among exhaust fans 5a to 5d, and the average value of the exhaust air volumes of only the exhaust fan which is determined to be in the disconnected state is calculated based on the history of the air volume stored in air volume storage 35. Subsequently, the sum of the actual exhaust air volumes of the exhaust fans from which the exhaust air volume signals were received and the average exhaust air volume of the exhaust fan which is in the disconnected state may be set to outdoor air supply fan 4 as a predetermined air volume. As a result, when the linked connection between any one of exhaust fans 5a to 5d and outdoor air supply fan 4 is cut off, ventilation can be more stably performed.

In Embodiment 2, when at least one of exhaust fans 5a to 5d is determined to be in a disconnected state by the processes of step S12 and step S14, the maximum exhaust air volume of each of exhaust fans 5a to 5d is calculated based on the history of the air volume of each of exhaust fans 5a to 5d stored in air volume storage 35, and the sum of the maximum exhaust air volumes is set to outdoor air supply fan 4 as a predetermined air volume. On the other hand, in the processes of step S12 and step S14, it may be that an exhaust fan which is in a disconnected state is determined from among exhaust fans 5a to 5d, and the maximum exhaust air volume of only the exhaust fan which is in the disconnected state is calculated based on the history of the air volume in air volume storage 35. Subsequently, the sum of the actual exhaust air volumes of the exhaust fans from which the exhaust air volume signals were received and the maximum exhaust air volume of the exhaust fan which is in the disconnected state may be set to outdoor air supply fan 4 as a predetermined air volume. As a result, when the linked connection between any one of exhaust fans 5a to 5d and outdoor air supply fan 4 is cut off, ventilation can be more stably performed.

In Embodiment 2, the history of the actual exhaust air volume of each of exhaust fans 5a to 5d is stored as the history of the exhaust air volume stored in air volume storage 35. However, the history of a total value of the exhaust air volumes of exhaust fans 5a to 5d may be stored instead. When any one of exhaust fans 5a to 5d is in a disconnected state, ventilation and air conditioning system 20 may calculate a total value of the maximum exhaust air volumes from the history of the total value of the exhaust air volumes stored in air volume storage 35, and set the supply air volume of outdoor air supply fan 4 so as to be equal to the total value of the maximum exhaust air volumes. Accordingly, ventilation and air conditioning system 120 is capable of reducing the storage capacity required for air volume storage 35.

Moreover, when any one of exhaust fans 5a to 5d before the disconnected state is turned into a disconnected state, ventilation and air conditioning system 120 may calculate the maximum value of the total value of the exhaust air volumes in an immediately preceding certain period in the history of the total value of the exhaust air volumes before the disconnected state stored in air volume storage 35. Ventilation and air conditioning system 120 then may set the supply air volume of outdoor air supply fan 4 so as to be equal to the calculated maximum value of the total value of the exhaust air volumes in the immediately preceding certain period. In this manner, ventilation and air conditioning system 20 is capable of setting the supply air volume of outdoor air supply fan 4 so as to be close to the air volume corresponding to the sum of the exhaust air volumes of exhaust fans 5a to 5d immediately before the disconnected state.

In Embodiment 4, the case has been described where the maximum supply air volume of outdoor air supply fan 4 is always set as the supply air volume of outdoor air supply fan 4 when in a disconnected state where the exhaust air volume signal cannot be received from any one of exhaust fans 5a to 5d. In contrast, when the user desires to positively pressurize the inside of general housing 1, it may be that the maximum supply air volume of outdoor air supply fan 4 is set as the supply air volume of outdoor air supply fan 4 in the disconnected state, and in other cases, the supply air volume of outdoor air supply fan 4 in the disconnected state may be set by any one of the methods described in Embodiments 1 to 3. Accordingly, control can be performed according to the user's desire during the disconnected state.

Moreover, when control of the exhaust air volume is performed on exhaust fans 5a to 5d largely based on the values obtained by various sensors, and/or when control of the exhaust air volume is performed on exhaust fans 5a to 5d based on the user settings, the maximum supply air volume of outdoor air supply fan 4 may be set as the supply air volume of outdoor air supply fan 4 in the disconnected state. In other cases, the supply air volume of outdoor air supply fan 4 in the disconnected state may be set by any one of the methods described in Embodiments 1 to 3. Accordingly, it is possible to prevent outdoor air supply fan 4 from being operated at the maximum supply air volume more than necessary in the disconnected state, and it is possible to reduce generation of noise and the like.

Moreover, circulation fans 6a to 6d and conveying fans 3a to 3d are connected to each other by ducts connecting rooms 2a to 2d and air conditioning room 18. However, circulation fans 6a to 6d do not always have to be connected by ducts, but a space, such as corridor connecting rooms 2a to 2d, can be regarded as a duct. In this case, the air in rooms 2a to 2d is conveyed from rooms 2a to 2d to the corridor by the circulation fans. The air in rooms 2a to 2d conveyed to the corridor is taken into air conditioning room 18 which is in communication with the corridor. The intake of the air into air conditioning room 18 is performed by an intake fan provided on the wall facing the corridor of the air conditioning room, or may be performed by negatively pressurizing air conditioning room 18 without using the circulation fans and/or the intake fan. Such a configuration is capable of contributing to uniformity of the humidity, although the circulation efficiency is reduced as compared with the case where the connection is made by the ducts.

INDUSTRIAL APPLICABILITY

The ventilation and air conditioning system according to the present disclosure is applicable to houses and complex housing such as condominiums. When the ventilation and air conditioning system is applied to a complex housing, one system corresponds to a household unit, and each household does not correspond to a single room.

REFERENCE MARKS IN THE DRAWINGS 1 general housing
2a room
2b room
2c room
2d room
3a conveying fan
3b conveying fan
3c conveying fan
3d conveying fan
4 outdoor air supply fan
5a exhaust fan
5b exhaust fan
5c exhaust fan
5d exhaust fan
6a circulation fan
6b circulation fan
6c circulation fan
6d circulation fan
10, 110, 210, 310 system controller
11a room temperature sensor
11b room temperature sensor
11c room temperature sensor
11d room temperature sensor
12a room humidity sensor
12b room humidity sensor
12c room humidity sensor
12d room humidity sensor
14 air conditioning room temperature sensor
15 air conditioning room humidity sensor
16 humidifier
17 dehumidifier
18 air conditioning room
19 input and output terminal
31 link controller
32 exhaust air volume receiver
33 disconnection determination unit
34 disconnected state supply air controller
35 air volume storage
36 average value calculator
38 maximum air volume calculator
39 disconnected state air volume storage

We claim:
1. A ventilation and air conditioning system, comprising:
an outdoor air supply fan which supplies an outdoor air to an inside of a room;
an exhaust fan which exhausts the outdoor air from the inside of the room; and
a system controller which is communicatively connected to the outdoor air supply fan and the exhaust fan to control an operation of the outdoor air supply fan and an operation of the exhaust fan,
wherein the system controller includes:
a link controller which controls the outdoor air supply fan and the exhaust fan in a linked manner in order that a supply air volume of the outdoor air supply fan is set according to an exhaust air volume of the exhaust fan;
an exhaust air volume receiver which receives an exhaust air volume signal from the exhaust fan, the exhaust air volume signal indicating the exhaust air volume of the exhaust fan;

a disconnection determination unit which determines a disconnected state where the exhaust air volume receiver fails to receive the exhaust air volume signal; and a disconnected state supply air controller which controls the outdoor air supply fan at a predetermined air volume when the disconnection determination unit determines the disconnected state.

2. The ventilation and air conditioning system according to claim 1, wherein the predetermined air volume is a maximum air volume of the outdoor air supply fan.

3. The ventilation and air conditioning system according to claim 1, wherein the predetermined air volume is a predetermined air volume to be used in the disconnected state, and is different from a maximum air volume of the outdoor air supply fan.

4. The ventilation and air conditioning system according to claim 1, wherein the system controller includes an air volume storage which stores a history of an air volume of the exhaust fan, and the predetermined air volume is based on the history of the air volume of the exhaust fan before the exhaust fan is turned into the disconnected state.

5. The ventilation and air conditioning system according to claim 4, wherein the system controller includes an average value calculator which calculates an average value of the air volume of the exhaust fan based on the history of the air volume of the exhaust fan, and the disconnected state supply air controller controls the outdoor air supply fan with the average value of the air volume calculated by the average value calculator as the predetermined air volume.

6. The ventilation and air conditioning system according to claim 5, wherein the average value calculator calculates an average value of the air volume of the exhaust fan in an immediately preceding certain period in the history of the air volume of the exhaust fan.

7. The ventilation and air conditioning system according to claim 4, wherein the system controller includes a maximum air volume calculator which calculates a maximum air volume in the history of the air volume of the exhaust fan, and the disconnected state supply air controller controls the outdoor air supply fan with the maximum air volume calculated by the maximum air volume calculator as the predetermined air volume.

8. The ventilation and air conditioning system according to claim 7, wherein the maximum air volume calculator calculates the maximum air volume in an immediately preceding certain period in the history of the air volume.

9. The ventilation and air conditioning system according to claim 1, wherein the disconnection determination unit determines the disconnected state when the exhaust air volume receiver fails to receive the exhaust air volume signal a predetermined number of times.

10. An outdoor air supply fan, comprising:

a fan which supplies an outdoor air to an inside of a room; and a system controller which is communicatively connected to an exhaust fan which exhausts the outdoor air from the room to control an operation of the fan and an operation of the exhaust fan, wherein the system controller includes:

a link controller which controls the fan and the exhaust fan in a linked manner in order that a supply air volume of the outdoor air supply fan is set according to an exhaust air volume of the exhaust fan;

an exhaust air volume receiver which receives an exhaust air volume signal from the exhaust fan, the exhaust air volume signal indicating the exhaust air volume of the exhaust fan;

a disconnection determination unit which determines a disconnected state where the exhaust air volume receiver fails to receive the exhaust air volume signal; and a disconnected state supply air controller which controls the fan at a predetermined air volume when the disconnection determination unit determines the disconnected state.

* * * * *